United States Patent [19]

Botnick

[11] 4,039,125
[45] Aug. 2, 1977

[54] PRESSURE BALANCING VALVE WITH THERMAL OVERRIDE

[76] Inventor: Irlin H. Botnick, 3155 Kersdale, Pepper Pike, Ohio 44124

[21] Appl. No.: 673,443

[22] Filed: Apr. 5, 1976

[51] Int. Cl.² .................. G05D 23/00; G05D 11/16
[52] U.S. Cl. .............................. 236/12 A; 236/93 B; 137/98
[58] Field of Search ............ 236/12 A, 93 B; 137/98, 137/100, 101, 112

[56] References Cited

U.S. PATENT DOCUMENTS

| | | | |
|---|---|---|---|
| 2,009,102 | 7/1935 | Bern | 137/98 X |
| 2,090,843 | 8/1937 | King | 137/98 |
| 2,778,373 | 1/1957 | Jaquith | 137/112 |
| 3,116,748 | 1/1964 | Wasson | 137/98 |
| 3,324,872 | 6/1967 | Cloud | 137/98 |
| 3,921,658 | 11/1975 | Botnick | 236/12 A |

FOREIGN PATENT DOCUMENTS

| | | | |
|---|---|---|---|
| 505,010 | 8/1951 | Belgium | 137/100 |
| 1,675,525 | 12/1970 | Germany | 137/100 |

*Primary Examiner*—John J. Camby
*Assistant Examiner*—Henry C. Yuen

*Attorney, Agent, or Firm*—P. D. Golrick

[57] ABSTRACT

A valving device for inclusion in a pair of lines delivering hot and cold water to a point of mixed flow use having respective flow valving sections including respective aligned valving members joined as a shuttle unit, secured to and extending through flexible diaphragm means isolating the sections, and longitudinally shiftable to decrease flow area in one section while increasing flow area in the other; each section having a flow constriction as a fixed resistance between the diaphragm means and a respective valved flow space, whereby upon change of the relation of supply pressure and consequent tendency to change flow ratio from a pre-existing relation, the shuttle shifts to null the difference of forces acting thereon in the two sections and thereby re-establish the flow ratio; a hot inlet temperature responsive override being includable. A valve housing, with respective hot and cold inlets and outlets to a main housing bore, receives a cartridge, generally cylindrical, threaded and O-ring sealed thereto; the cartridge containing and providing a bore for the valving sections, diaphragm means, the shuttle unit, the constrictions, the valving areas, and passages to the housing inlets and outlets; and thermal override.

9 Claims, 4 Drawing Figures

PRESSURE BALANCING VALVE WITH THERMAL OVERRIDE

Where hot and cold water are mixed for use with a desired mixed temperature as at a shower, bathtub, sink mixing valve, or an appliance, for some examples, the user directly or indirectly, or the appliance automatically, may establish a hot and cold water flow ratio to give the desired mix temperature. However, after that ratio is established, changes in either or both of the hot and cold water supply pressures affect the mixed flow temperature, unless means to compensate for the change are included in the water lines supplying the point of use, or equivalently, in the mixed flow discharge device at the point of use.

Otherwise sudden supply pressure changes may lead to an undesirable or uncomfortable and even dangerous mixed flow discharge; as by drop in cold water or increase in hot water supply pressures, which could lead to a burning or scalding of a shower user, or a cold water pressure increase or hot water decrease which could lead to chilly discomfort.

Therefore various devices to overcome this problem have been proposed or commercially offered in the prior art represented by patents or products actually produced; those devices being either incorporated in water mixing valves or water utilizing appliances, or intended for separate installation in supply lines. Some devices have relied upon mixed flow temperature sensing to control relative flow rates, being therefore basically temperature control devices, while others rather have sensed supply pressure changes, usually a pressure differential in the supply lines or arising from changed flow conditions induced by supply changes. It is with the latter type of device and improvements therein that the present invention is concerned.

Prior art devices of the type here in question have suffered various disadvantages, such as allowing some cross flow to occur, especially after a period of service, between the hot and cold lines even when utilized water flow is not occurring, as well as cross leakage in the device when active. In some, the construction is such that the device is not easily serviced, or maintenance is expensive. Some devices have been too sluggish in response or not able closely enough to compensate for pressure changes. Some devices, while attempting to abate one or more of the above problems more or less successfully, have been rather complex in structure or expensive to manufacture.

The present invention provides a device of the character described utilizing a simple effective diaphragm or bellows arrangement to provide two isolated valving chambers or sections in which are simultaneously operable respective valving elements joined to the diaphragm and to each other in a shuttle-like structure. Also in each chamber or section a fixed resistance or flow construction is simply provided between a respective inlet and flow valving area to improve response and closeness of control. Further, the structure can be embodied in a simple valve housing which may be either integral with or a compact adjunct to a flow mixing apparatus, having a form simple in structure and fabrication, with a main bore into which is axially inserted or threaded a cartridge unit as a sub-assembly embodying the primary structure for valving chambers, flow constrictions as fixed resistances, diaphragm means joined with the valving members, flow passages, and seal means to seal to the body, all in fashion allowing simple screwed-in insertion and assembly of the cartridge components, and of the cartridge to body without need of careful alignment of flow passage mouths and the like; the cartridge serving to cap the housing bore.

It is the general object then of the present invention to provide an improved relative flow control device of the character described for incorporation in hot and cold water supply lines.

Another object is to provide a device of the above described character which is relatively simple in overall structure and fabrication, while including a thermal override arrangement.

Another object is to provide a device of the character described in which likelihood of cross connection between hot and cold supply lines or leakage between valving sections is eliminated by a simple effective diaphragm means isolating hot and cold valving sections, and including a thermal override arrangement and preferably providing a respective fixed flow resistance between an inlet and valved flow area in each section of the device.

A still further object is to provide a device of the described type wherein principal valving components including a thermal override, diaphragm and seal means, fixed resistances and principal valve flow passages, all are incorporated in a cartridge assembly, in itself simple of fabrication and assembling, and simple to assemble into the housing.

Other objects and advantages will appear from the following description and the drawings wherein.

Figure 1:
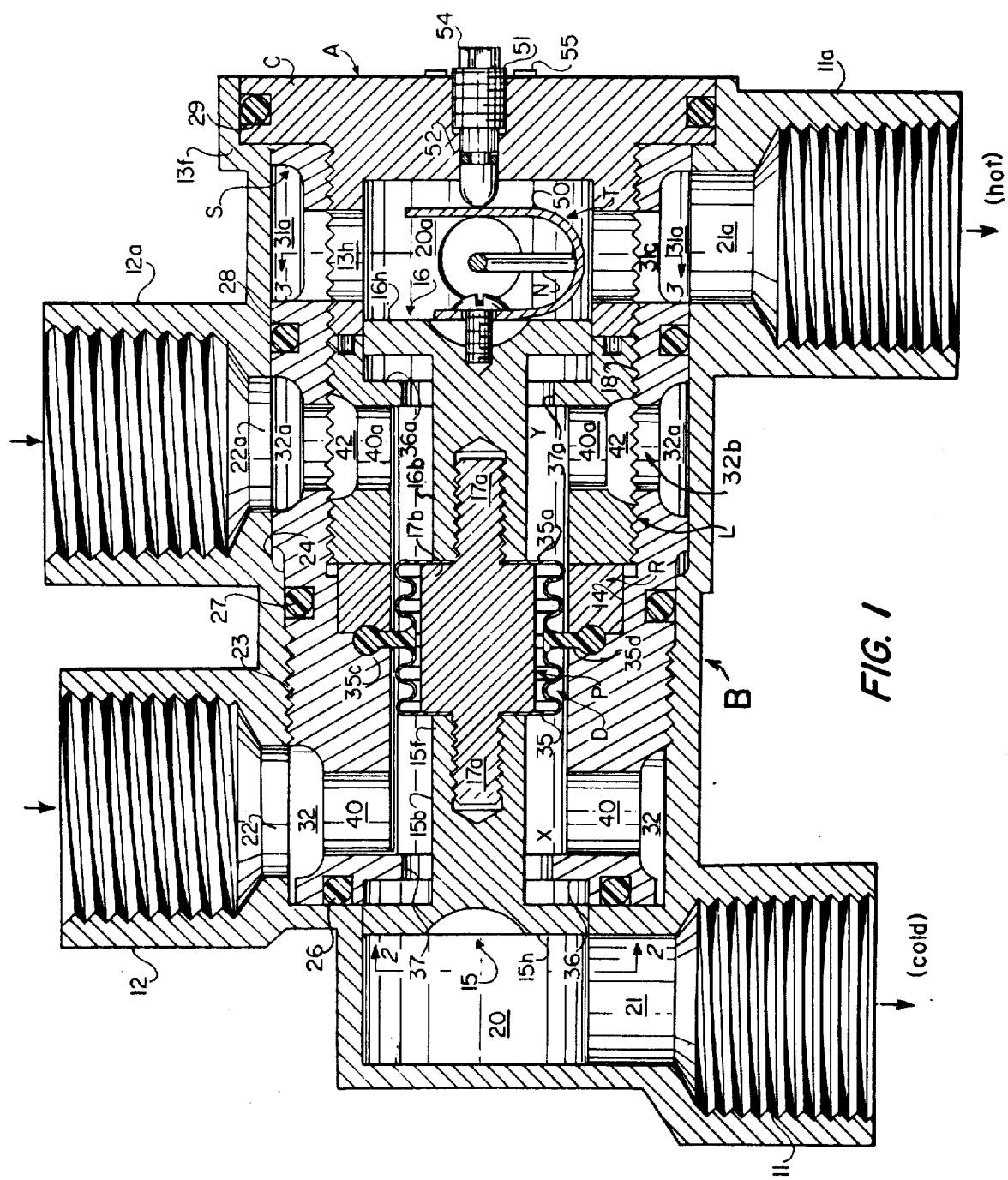
FIG. 1 is a longitudinal section of a valve unit incorporating the invention.

The drawings represent one embodiment of the invention in a dual coordinated valve device for flow ratio stabilization comprising as principal components a hollow housing B, having at each end respective paired oppositely extending outlet and inlet connections 11–12, 11a–12a opening to a main housing cylindrical bore; a valving cartridge A received in the housing bore and including an inner-end-recessed, plug-like element C also affording a closure or cap for the housing. The cartridge assembly also includes an outer hollow shell S generally cylindrical in external shape having the male-threaded cap C screwed therein as a plug, and internally divided by flexible diaphragm means D into two valving chambers, X, Y, in which are axially shiftable, jointly as a valving shuttle unit, respective valving members 15, 16, extending in coaxial alignment from opposite sides of the diaphragm means to control flow through passages to be described, thereby to form a respective valving section for each inlet and outlet connection pair. The cartridge further includes a diaphragm-spacing and valving-element-supporting spindle P; and diaphragm spacer ring R received in a shell counterbore 14 endwise of a threaded sleeve L screwed into a long female threaded shell outer counterbore 18.

The inlet connection and corresponding outlet connection are female threaded on parallel offset axes for connection of each pair in a respective line of a pair of hot and cold water lines supplying, for example, a shower, mixing valve or other appliance. The outlet connection 11 is open through outlet passage 21 to a central recess 20 in the housing bore bottom; inlet connection 12 through housing wall aperture 22 being open radially to the housing bore inner section female threaded at 23; the outlet and inlet connections 11a, 12a, opening respectively through housing wall apertures 21a and 22a to the outer and inner regions of a deep, unthreaded counterbore portion 24 of the housing.

Cartridge-to-housing sealing is effected on a flat bore bottom shoulder around the outlet recess 20 by "O" ring 26 received in a coaxial groove in the flat shell end; on an unthreaded part of the housing inner bore between inlet apertures 22, 22a, by "O" ring 27 in a circumferential shell groove; on the outer counterbore region 24, between inlet and outlet apertures 21a, 22a, by "O" ring 28 in a shell outer groove; and on a housing peripheral surface inside its open end by "O" ring 29 received in a groove in the periphery of the cap flange 13f.

Accordingly, when the cartridge is screwed into the housing bore, the outlet recess 20 has a sealed connection endwise to the inner end of the shell, hence of chamber X; and with broad external circumferential grooves 32, 32a and 31a provided in the cartridge shell, at longitudinal positions or axial locations corresponding to the inlet apertures 22, 22a and outlet aperture 21a, these other inlets and outlets have isolated sealed paths to valving chamber ports or ends as later described.

The headed valving elements or members 15, 16 being identical are described as for 15, having a cylindrical stem or body 15b; a squared head 15h at its outer end with an arcuate tool engagement slot, and rounded corners slideably engaging on and guided by the cylindrical wall of recess 20 (or cap recess 20a for element 16), and the head flats therebetween forming in effect peripheral slots for flow space past the head. The other, somewhat enlarged, inner stem end 15f, with a female threaded blind bore received on a stud-like projection 17a of the spacer spindle P cooperates with the adjacent end face of spindle spacer body 17b to clamp a respective centrally apertured portion 35 (or 35a for valve element 16) of a resilient elastomeric diaphragm member 35. The edges of the clamping faces here, and so also on peripheral clamping regions later described, are radiused to minimize diaphragm wear. With the valving members and spacer axially bored, a bolt passed therethrough and a nut on the bolt may secure the shuttle assembly, clamping the flexible diaphragm means.

The inner end of shell S is shallowly circularly recessed forming a valve head guiding wall, continuing or extending the aligned cylindrical surface of the recess 20, up to a shoulder 36, with which the underside of the head by variable spacing cooperates as a primary valving area or circumferentially continuous radial flow space, so that as the valving member head moves to and from the shoulder 36 the effective flow area from the interior of the shell to the outlet is decreased or increased. The valving shoulder 36 happens to coincide with the outer face of the radially inwardly extending circumferential lip 37 between the end recess and the inner bore portion of the shell at a location between the inlet to the chamber and the valving area. The valving area for any given axial spacing of the valve head from the lip may be characterized by the area of its entrance at the edge of lip 37, since from that region on for radially outward flow the radial flow cross section or area increases. This narrow lip, importantly in its spacing from the valve stem 15b as a constriction defining a short annular flow area, always provides a fixed flow restriction or resistance upstream from the respective valving head to develop a back pressure on the adjacent diaphragm. The groove 32 communicates with the left valving space chamber X, through a plurality of four radial inlet holes 40 providing the total inlet area. Similar relations prevail at the chamber Y.

The diaphragm means D may comprise as in FIG. 1 an elastomeric bellows sleeve with annular bellows folds and centrally apertured flat disk-like end walls, as at 35, 35a into which the spindle body P may be inserted by virtue of the material stretchability with the circumferentially running folds or corrugations generally radially clearing the spindle body; and at mid-length, an integral radial flange 35d extending as a disk portion outwardly for clamping to the composite valving bore wall. Or as in FIG. 4, the diagraphm means D may assume the form of separate disks running out to be clamped in the bore wall.

On the outer periphery of such a diaphragm disk portion, a molded continuous circumferential bead 35c is provided to be held captive in an annular space defined between a clamping ring R and an abutment shoulder, as by opposed grooves in the shoulder of intermediate counterbore 14 and one end of ring R, with the sleeve L bearing on the other ring end, where there is used the bellows sleeve encircled by mid-length disk. The outer end face of sleeve L and also cap C has tool engaging holes or formations for threading manipulation.

Where separate diaphragm disks are used, (see FIG. 4) each circumferential bead is held captive in a generally square-sectioned annular space formed by a respective external end edge rabbet on ring R, the intermediate counterbore surface 14, and an adjacent radial abutment shoulder means, as at the shell counterbore shoulder for one diaphragm disk, or for the other the inner end of the sleeve L threaded in from the shell outer end to clamp the diaphragm with interposed spacer ring R, between the counterbore shoulder and the sleeve end. In the disk diaphragms 35 of FIG. 4 there is also molded a respective annular fold 35d of U-shaped cross section accommodated between the spindle body and interior of ring R. As in the bellows form, this allows movement, with negligible restraint, of the valving members and spindle as a unit under differential of forces, including the back pressures acting on the respective diaphragms.

Figure 4:
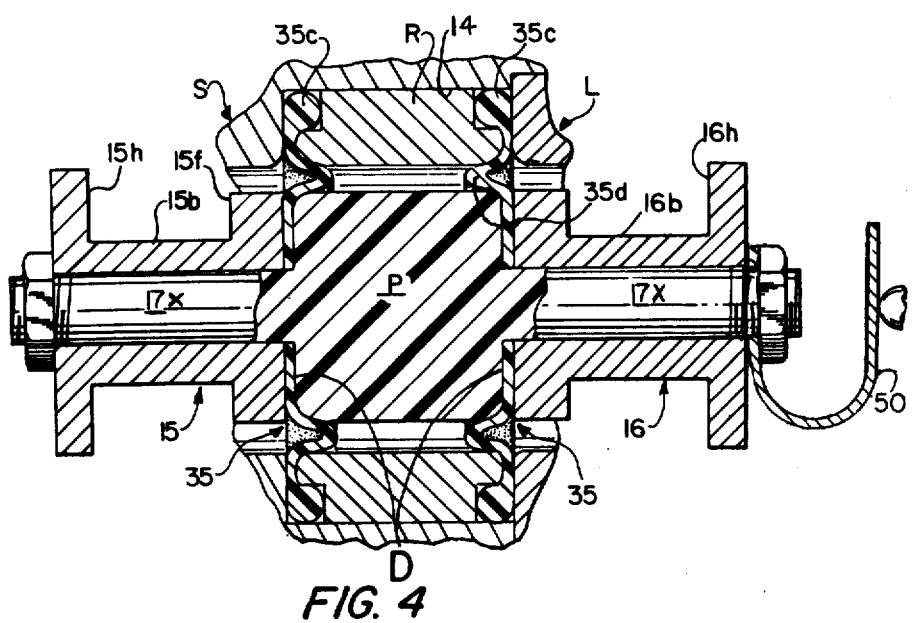
FIG. 4 shows in section a spindle and diaphragm modification.

FIG. 4 also shows an assembly modification of the spindle body and valve members, wherein rather than the FIG. 1 assembly mode or using one through-bolt, the valve members have unthreaded central bores through which elongated studs 17x of the spindle body extend to receive respective clamping nuts for each valving member and on one end the thermally responsive strip 50 later described for FIG. 1.

The inner diameters of shell S and sleeve L inward of the respective lips 37-37a are equal and preferably so also the inner diameter of ring R, forming a valving bore in the thus composite body.

The axial flow area of the lip-formed constriction about the stem is less than the total flow area of the inlet apertures or ports 40; and also less than the area for flow axially past the edges of head 15h. Further to provide similar or symmetrical flow space geometry, in the right chamber Y, inlet ports 40a, the lip 37a, a shallow sleeve end recess outward of the valving shoulder 36a at lip 37a, the head 16h and the diameter of cap recess 20a and thus the consequent flow and restriction areas, are sized similarly to those previously described at left chamber X and the valve member 15.

It has been discovered that sensitivity of the device conferring quick response to small supply line pressure differentials without hunting is attained, with the geometry of the valving components and restrictions symmetrical, by the following conditions for both valving chambers or sections: the inlet flow area is greater than the restriction flow area, and greater than the maximum of the variable radial flow area, i.e., the valving flow area; the axial flow area past the head is greater than the restriction flow area, and always greater than the valved or variable radial flow area; the variable radial flow area is at all times less then the restriction flow area; and the valving flow area is at all times less than the effective working piston area on which acts the water pressure in the space between inlet and restriction, that piston area including also the respective diaphragm face, that is, the area of the projection, onto a plane perpendicular to the valving shuttle motion or axis, of the diaphragm face exposed to water and of stem surface so exposed, e.g., in FIG. 1 and FIG. 4 being the annular area between the bore wall and a diaphragm-clamping valving member stem as at 15b, in other words the difference between the bore cross section area and the valving member stem area.

With the above relations established, the radial flow areas control the back pressure developed in the chambers to act on the respective effective piston working areas, to maintain the desired temperature despite variation in pressure; the radial flow area is great enough to avoid hunting, i.e., repeated off-on shifts in opposite directions and small enough to ensure stability of temperature.

Thus ports or features on the right side of FIG. 1 which are analogous to those described for the left bear similar reference numerals but with suffixed a, even though not described.

Figure 3:
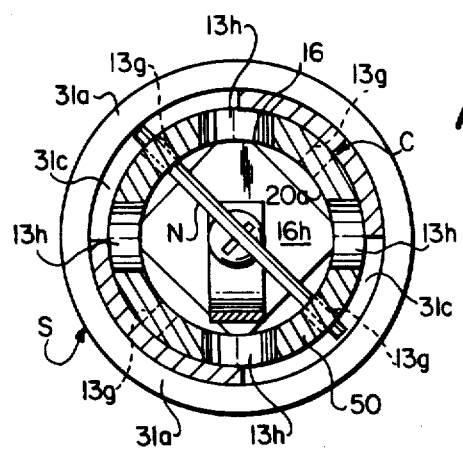
FIG. 3 is a section taken at 3—3 in FIG. 1.
Figure 2:
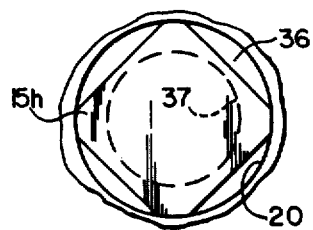
FIG. 2 is a section taken at 2—2 in FIG. 1.

The bottom of groove 31a (see FIG. 3) has two narrower slots 31c through the sleeve wall, diametrically opposed and of 90° arcuate extent, so that with four equi-spaced radial holes 13h in the threaded cap wall at corresponding axial location, communication of cap recess 20a with the outlet connection 11a is assured irrespective of the relative screwed-in rotational positioning of the cap C and sleeve L.

Fastener means, such as a screw or pin N passed transversely through at least one side of the cap and shell upon assembly, enables screwing the cartidge out of the housing by tool engagement with the cap. The arcuate slots and one pair of another two pairs of smaller radial holes 13g alternating with the water flow holes in the cap may be used for this purpose, since it is sufficient that the pin pick up the entire shell for unscrewing even after a partial rotation of the cap in the shell. The holes for pin N being smaller than the slot width are offset as far as possible to one side of the slots, to give clearance for element 50 to be described.

In sleeve L, a plurality of four radial ports 40a and a broad circumferential groove 42 intersecting same, and a plurality of four radial holes 32b from groove 32a through the shell wall to groove 42, similarly assure communication of the inlet connection 12a with the valving chamber Y, irrespective of relative rotational positioning of the sleeve L in the shell S as well as of the latter in housing B.

It should be obvious that with the several portions of the main bore from its open end to recess 20 being coaxial and the axes of the inlet and outlet connections parallel, the housing is readily and inexpensively machined whether starting from a cored brass casting as a blank or from a solid blank forging of desired exterior shape; and that similarly ring R, sleeve L, cap C and shell S, and the valving members and spacing spindle body are comparatively inexpensively produced by screw machine operations say from metal bar stock or by die casting or molding from plastic such as CELCON. Thus a composite body providing flow passage, valving section chambers and restrictions, and means for mounting section isolating and valving actuating diaphragms allowing sealing of connected valving members is readily provided.

As a further safety expedient T, includable at a point relatively little sensitive to flow space geometry change, namely in one of the two recesses 20 or 20a (which then will be used in the hot water line), a somewhat U-shaped bimetallic thermally responsive broad strip 50 has one leg screw-secured flat on the flat end of a valving head as at 16h, with the other leg then centered on a diameter of the recess to be engageable with the rounded inner end of a response-setting stop pin 51. The drawings depict the element 50 thermally expanded into contact with pin 51 with the shuttle device yet in "neutral" position, i.e., with valving heads equi-spaced from the respective shoulders, hence with equal valving areas prevailing. However, the element 50 is contracted into a position not interfering with pressure differential responsive shuttling action when the hot water is below temperatures at which its safety action is to become effective.

A reduced inner end of pin 51 is O ring sealed at 52 to a coaxial hole through the cap, and its outer end threaded into a hole counterbore, so that by a tool engaging an outwardly projecting pin end or head formation 54, the axial position of the inner end is readily changeable. Conveniently a series of arcuately spaced temperature or temperature-change reference marks 55 is arranged on the cap end about the pin receiving hole, and the pin itself then may carry a cooperating reference or index mark. In FIG. 4, the respective nut holds strip 50 on the end of the screw-threaded right spindle stud 17x; advantageously, the spindle is plastic with low conductivity, to minimize heat transmission effects on 50.

For cartridge assembly, after placement of the bellows (or separate diaphragm disks) on the spindle body with ring R (between the separate disks where used) these are positioned in sleeve S. The valve member 15 is inserted through the shell bottom aperture and screwed onto one spindle end. Thereafter sleeve L is screwed tightly in place, clamping the diaphragm means against leakage; and then the member 16 (with bimetal element 50 in position where used, and included in the cartridge) is inserted through the sleeve L and screwed onto the spindle body. Finally the cap C bearing screw pin 51 is screwed into the shell end and the pin N passed therethrough with clearance relative to the element 50, completing the cartridge assembly, to which the several O-rings are finally applied before the cartridge is inserted in the housing to complete the valve device.

The cap tool engagement formation may be a simple central slot where the temperature responsive device T is not used, or is at the opposite end so that the setting screw pin 51 is located in the housing wall at recess 20, or may be a hex head projection. That formation provides tool engagement not only for the cap going into the sleeve but also for the cartridge as a whole as it is screwed in and out of the housing. Of course minor variations in the cartidge assembly steps may achieve the same final result. That the described device is easy to service should be obvious.

Considering operation of the device as included in the hot and cold water supply pipes to a shower where the user has selected or established a hot and cold flow relation giving a desired mixed water temperature, the shuttle-like valving unit assumes a position, under the back pressure effect of the hot water flow (say in the right chamber or section Y) and the back pressure effect of the cold water flow (in the left chamber X), where the opposed forces or pressures acting on the shuttle, including inlet static pressures acting on the effective central piston areas including and adjacent the respective sides of the diaphragm means, and the dynamically or flow developed pressures in the valving end regions acting on the heads of the valving members, are balanced, that is, any overall pressure differentials have become nulled.

Then if, as commonly occurs, cold water pressure drops because of sudden demand on the supply feeding the cold water inlet, the decreased back pressure sensed in the chamber X results in a pressure differential as between Y and X, hence in forces acting on the opposite sides of the piston with diaphragm means connected to the shuttle unit, which accordingly shifts to the left until the forces, that is, static and dynamic pressures acting through the diaphragm means and valve heads on the shuttle are again equalized, decreasing the effective valved flow area out of Y for hot water, while opening that out of X for the cold, re-establishing the same flow rate ratio to the shower, hence temperature of the water delivered by the shower, as long of course as the supply temperatures do not vary.

A similar action will occur when there is an increase in the hot water supply pressure, hence flow. Analogous actions occur to increase hot water flow and throttle the cold when the cold water supply pressure increases or the hot pressure drops.

Valving devices constructed as here disclosed have kept a mixed flow temperature change within 0.5° F for water issuing from a mixing device such as a shower head, with of course constant hot and cold water supply temperature, despite hot and cold supply pressures of 80 and 30 psi respectively, or even reversely of 30 and 80 psi.

The function of the temperature responsive device 50–51 is that of monitoring or observing the incoming hot water temperature rather than a temperature thermostating device sensing and responding to any mixed water temperature to change flow, to maintain mixed temperature at a desired point or range. As element 50 responds to increased temperature by expanding, that is, increasing the spread between its legs with the free leg moving away from the head, engagement with the pin end develops reaction force shifting the shuttle to the left to close off the hot water valving passage in part or entirely when the inlet temperature exceeds a pre-set point (say 160° F to 170° F) for which the temperature responsive device is set for safety, thus in a sense overriding then the basic flow ratio stabilizing function.

Upon total failure of either water supply, even without the thermal override device, the shuttle shifts in the otherwise force-differential-nulling direction to the extreme position shutting down the other water supply flow.

What is claimed is:

1. A valving device to be included in hot and cold water supply passages for maintaining a hot and cold water flow ratio established at a point of use, despite subsequent variations in the relative hot and cold water supply pressure; comprising a body providing
    a central valving bore,
    an inlet and outlet for hot water opening to one half of the bore length at axially spaced locations,
    an inlet and outlet for cold water opening to the other half of the bore length and similarly spaced axially, and a respective similarly located circumferential inward lip or flange restriction between each inlet and outlet providing a fixed flow resistance therebetween;
flexible means at bore mid-length isolating the two halves of the bore into hot and cold water valving chambers; the said inlets opening radially to said bore at axial locations between said flexible means and a respective said restriction; a valving shuttle axially shiftable in the valving bore extending through and secured to said flexible means and
    providing a respective bore valving member in each chamber and cooperating with a respective bore formation located in the bore between the respective restriction and outlet to form a valved flow area varied by axial shifting of the valve member under change of a differential in inlet hydrostatic pressures applied to the flexible means until nulling of total forces of pressure on the flexible means and dynamic flow pressures and hydrostatic pressures on the valving members, with each valving flow area decreased as the other is increased by axial shift of said valving shuttle;
    a thermally expansible element supported on the hot water valving member on the outlet side of the respective valving chamber,
        said expansible element extending toward an adjacent end wall of the body; and
    a stop element supported by said body and projecting into the discharge region for said hot water valving member, and engageable by and to serve as a reaction abutment for the expanded thermally expansible element to exert force shifting the hot water valving member toward a closed position.

2. A valving device as described in claim 1, wherein said stop element is axially adjustable to select a hot water temperature at which, by thermal element engagement therewith, the valving shuttle is shifted for diminishing or shutting off hot water flow.

3. A valving device as described in claim 1, wherein said thermally expansible element comprises a bimetallic strip of U-shape, and having
    one leg of the U secured to the free end of the hot water valving member, thereby disposing the U-shaped element within the outer or discharge end of the hot water chamber with
    the other leg proximate to the end wall of the hot water chamber.

4. A valving device as described in claim 1, wherein said stop element comprises
    a pin extending through and slidably rotatably sealed to a central aperture of the end wall to provide a reaction abutment for the thermally expansible element within the hot water chamber; the outer end of said pin being threaded into a threaded counterbored outer part of the end wall central aperture to afford an adjustable setting of the abutment position.

5. A valving device as described in claim 1, wherein said valving shuttle embodies low conductivity material insulating its hot water valving end from its cold water valving end to reduce heat transfer between said thermally expansible device and the cold water valving end.

6. A valving device as described in claim 1, wherein said thermally expansible element comprises a bimetallic strip of U-shape, and having one leg of the U secured to the free end of the hot water valving member, thereby disposing the U-shaped element within the outer or discharge end of the hot water chamber with the other leg proximate to the end wall of the hot water chamber; and said stop element comprises a pin extending through and slidably rotatably sealed to a central aperture of the end wall to provide a reaction abutment for the free leg within the hot water chamber;

the outer end of said pin being threaded into a threaded, counterbored outer part of the end wall aperture to afford an adjustable setting of the abutment position.

7. A valving device as described in claim 1, wherein said body is a composite structure comprising a hollow housing, a generally cylindrical hollow shell therein, a sleeve in the shell and a plug in the shell;

said hollow housing having a main bore at one end open and having a bottom wall at the other end, an outlet opening to the main bore through a bore bottom wall central recess, an inlet paired with said outlet and opening radially to the main bore at a location spaced from the bore bottom, a second outlet opening radially to the main bore at an axial location near the open end, and a second inlet paired with the second outlet and opening radially to the main bore between the second outlet and first said inlet;

said hollow shell being threaded into said main bore in the housing and having a bore portion through an inner end and a counterbore at the other end;

elastomeric diaphragm means in the shell serve as said flexible means;

said sleeve having a through-bore equalling in diameter the bore portion of the shell and threaded into the counterbore thereof, and cooperating with abutment shoulder means in said shell to peripherally clamp said diaphragm means, said bore portion of the shell and sleeve through-bore forming said central bore as a valving bore in which said valving shuttle is shiftable;

said plug being threaded into the shell counterbore end as a closure therefore and having in its inner end a central recess opening to and aligned with the outer end of the sleeve bore, and on its outer end a flange forming a closure for the open end of the said housing bore;

respective inward circumferential lips near the outer ends of said bore portion and said through-bore forming the fixed flow restrictions in the respective valving sections formed in the valving bore by said diaphragm means;

said shell, sleeve and plug having flow passages putting the said inlets of the housing in communication with locations of respective said valving sections between the diaphragm means and respective restrictions, and putting the second said outlet in communication with the plug recess and thereby with the adjacent end of said valving bore;

the other end of the valving bore being similarly in communication with the first said outlet through the housing main bore bottom wall recess; seal ring means carried externally by said shell for circumferentially sealing on the housing interior between the successive locations of said inlets and outlets, and by the flange of said plug for sealing on the adjacent housing end;

said thermally expansible element being supported on the hot water valving member to extend toward an adjacent end wall of the plug; and said stop element being supported by said plug to project into the discharge region for said hot water valving member; said shell with said shuttle, diaphragm means, sleeve expansible element and plug assembled therein constituting a cartridge threadable into said housing and thereto sealed by said seal ring means.

8. A valving device as described in claim 7, wherein said plug has an outer end face formation adapted to tool engagement for screwing operations, and means received through apertures of sleeve and plug to restrain rotation of the plug relative to the shell and thereby ensuring unscrewing of the cartridge as a unit from the housing bore.

9. A valving device as described in claim 7, wherein the hot water valving chamber is adjacent the said plug, with the said thermally expansible element a broad bimetallic strip formed to a U-shape with one leg of the U secured to the free end of the hot water valving member thereby disposing the U-shaped element within the recess of the plug with its other leg proximate to the plug recess end wall;

said stop element comprising a pin extending through and slidably rotatably sealed to a central aperture of the plug to provide a reaction abutment within the recess for the free leg; the outer end of said pin being threaded into a threaded counterbore outer part of the plug central aperture to afford an adjustable setting of the abutment position.

* * * * *